United States Patent [19]

Jackson et al.

[11] 3,989,058

[45] Nov. 2, 1976

[54] MODULAR VALVE

[75] Inventors: Byron L. Jackson; Joseph P. Wagner, both of Knoxville, Tenn.

[73] Assignee: Robertshaw Controls Company, Richmond, Va.

[22] Filed: July 16, 1975

[21] Appl. No.: 596,565

[52] U.S. Cl. .................................. 137/269; 251/11; 251/367; 137/625.48

[51] Int. Cl.$^2$ .......................................... F16K 27/04

[58] Field of Search .............................. 251/11, 367; 137/625.48, 625.69, 269, 271; 60/527

[56] References Cited

UNITED STATES PATENTS

| | | | |
|---|---|---|---|
| 3,163,175 | 12/1964 | Pearson | 137/625.69 X |
| 3,199,538 | 8/1965 | Anthon | 251/367 X |
| 3,381,469 | 5/1968 | Schwartz | 60/527 |
| 3,511,276 | 5/1970 | Jessen et al. | 137/625.69 X |
| 3,719,199 | 3/1973 | Mentink | 137/625.69 X |
| 3,756,083 | 9/1973 | Tatsutomi et al. | 60/527 X |
| 3,841,551 | 10/1974 | Ota | 60/527 X |
| 3,887,159 | 6/1975 | Obermaier et al. | 251/11 |

*Primary Examiner*—William R. Cline

*Attorney, Agent, or Firm*—Candor, Candor & Tassone

[57] ABSTRACT

A condition responsive valve construction having a first housing provided with an internal chamber and an inwardly directed shoulder projecting into the chamber and defining a first valve seat on one side thereof and a spring seat on the other side thereof. An axially movable valve means is disposed in the chamber for controlling the valve seat. A spring is disposed between the spring seat and the valve member to tend to move the valve member in one axial direction in the chamber. A condition responsive device is carried by the housing and is operatively interconnected to the valve member to move the valve member in the other axial direction upon an increase in the sensed condition. One or more additional housing can be added to the first housing in stacked aligned relation therewith and with each new housing having a valve seat arrangement to be controlled by the valve member.

9 Claims, 11 Drawing Figures

MODULAR VALVE

This invention relates to an improved condition responsive valve construction and method of making the same.

It is well known that a condition responsive valve construction can be made from a plurality of parts wherein a plurality of housing members are stacked together in aligned relation to produce the desired number of valve seats and ports to be interconnected by an axially movable valve member disposed in the aligned chambers of the housing parts. For example, see U.S. Pat. Nos. 3,122,168; 3,199,538; 3,202,170; 3,315,702; 3,516,442 and 3,719,199 for such prior known modular valve constructions.

It is a feature of this invention to provide an improved valve construction wherein two or more housing members can be secured together to cooperate with an axially movable valve member disposed therein.

Another feature of this invention is to provide a simplified method of making such a valve construction.

In particular, one embodiment of this invention comprises a first housing means having an internal chamber therein and an inwardly directed shoulder projecting into the chamber and defining a valve seat on one side thereof and a spring seat on the other side thereof. An axially movable valve member is disposed in the chamber for controlling the valve seat. A spring is disposed between the spring seat and the valve member to tend to move the valve member in one axial direction in the chamber. A condition responsive device is carried by the first housing means and is operatively interconnected to the valve member to move the valve member in the other axial direction upon an increase in the sensed condition. At least one additional housing means is secured to the first housing means and has a chamber disposed in aligned relation therewith and receiving the valve member therein. The valve seat can be defined by a resilient annular member disposed against one side of the shoulder of the first housing means and an adjacent shoulder of the additional housing means and projecting inwardly beyond the shoulders to be disposed in sealing engagement with the valve member.

Accordingly, it is an object of this invention to provide an improved condition responsive valve construction having one or more of the novel features set forth above or hereinafter shown or described.

Another object of this invention is to provide an improved method of making such a condition responsive valve construction, the method of this invention having one or more of the novel features set forth above or hereinafter shown or described.

Other objects, uses and advantages of this invention are apparent from a reading of this description which proceeds with reference to the accompanying drawings forming a part thereof and wherein.

Figure 1:
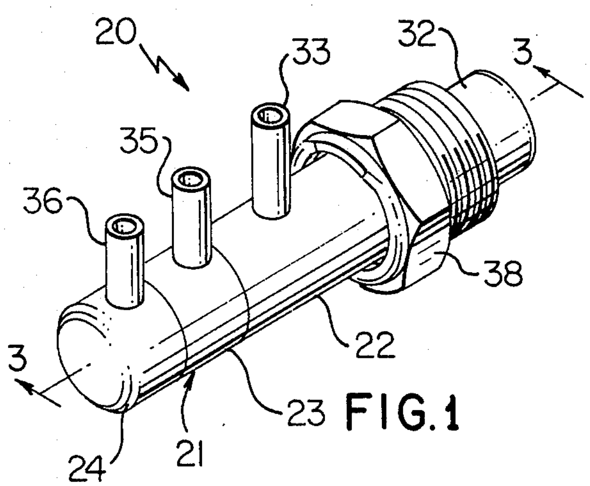
FIG. 1 is a perspective view of one condition responsive valve construction of this invention.
Figure 2:
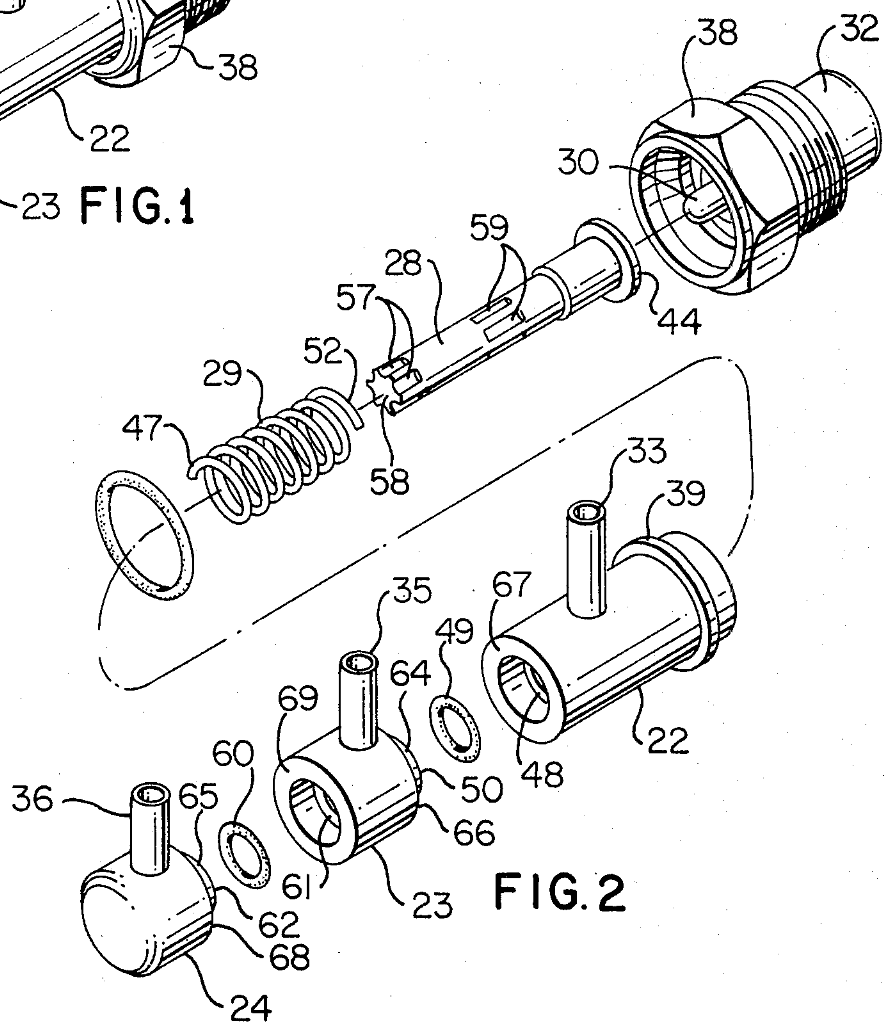
FIG. 2 is an exploded perspective view of the various parts of the valve construction of FIG. 1.
Figure 5:
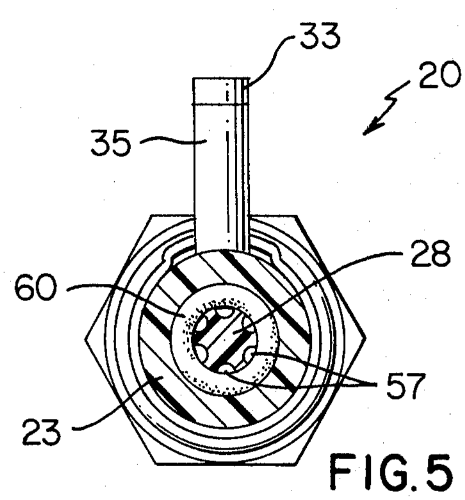
FIG. 5 is a cross-sectional view taken on lines 5—5 of FIG. 3.

While the various features of this invention are hereinafter described and illustrated as being particularly adapted to provide a temperature responsive valve construction, it is to be understood that the various features of this invention can be utilized singly or in any combination thereof to provide a valve construction responsive to other conditions as desired.

Therefore, this invention is not to be limited to only the embodiments illustrated in the drawings, because the drawings are merely utilized to illustrate one of the wide variety of uses of this invention.

Figure 3:
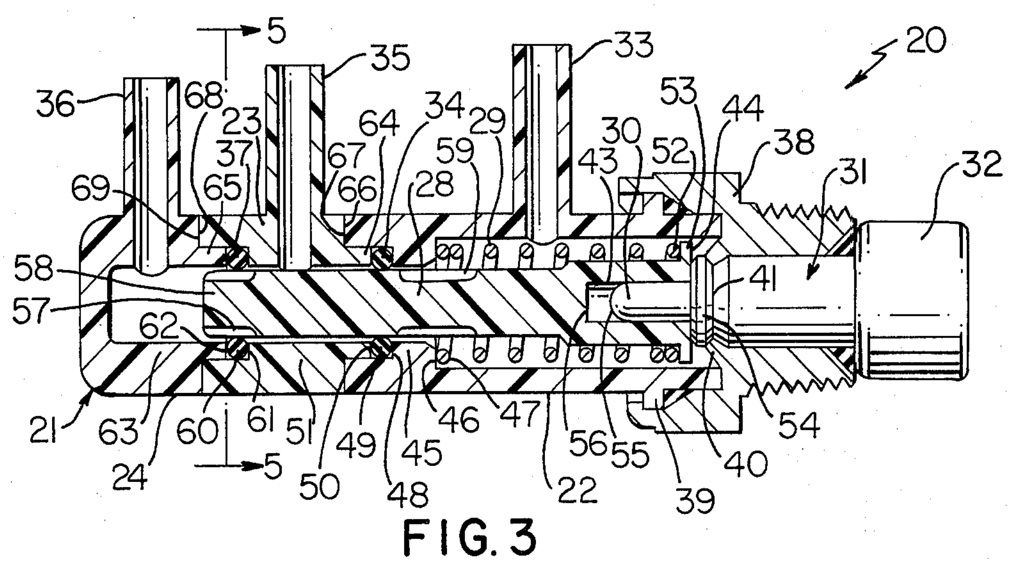
FIG. 3 is an enlarged, cross-sectional view taken on line 3—3 of FIG. 1 and illustrating the valve construction of FIG. 1 in one operating condition thereof.

Referring now to FIGS. 1–5, one embodiment of the improved valve construction of this invention is generally indicated by the reference numeral 20 and comprises a housing means that is generally indicated by the reference numeral 21 and formed of a plurality of housing parts 22, 23, and 24 secured together in aligned relation in a manner hereinafter described and respectively having aligned chambers 25, 26, and 27 therein respectively receiving an axially movable valve member 28 which is normally urged to the right in FIG. 3 by a compression spring 29 and is operatively interconnected to a piston 30 of a piston and cylinder arrangement 31 that is temperature responsive and is carried by the housing part 22 in a manner hereinafter described.

Figure 4:
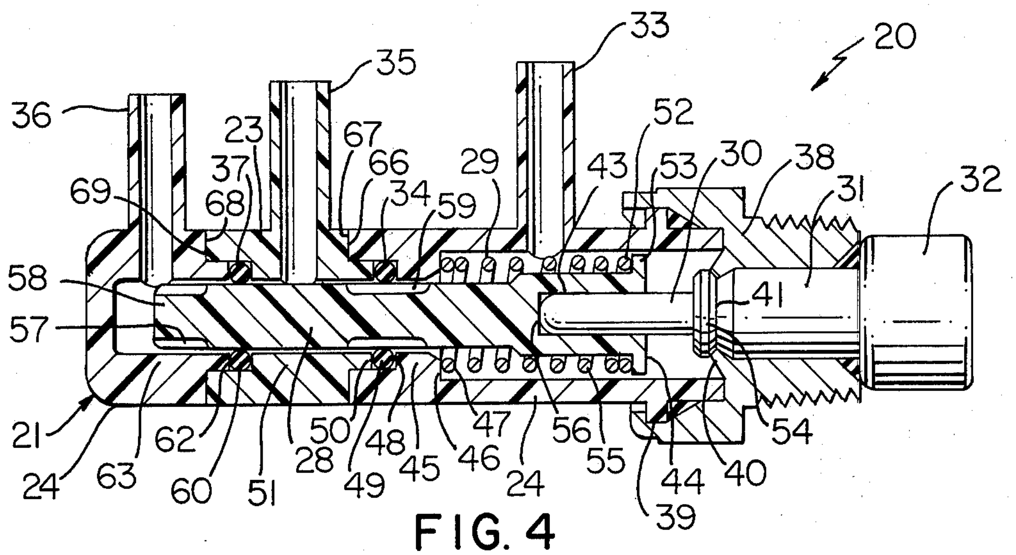
FIG. 4 is a view similar to FIG. 3 and illustrates the valve construction of FIG. 3 in another operating condition thereof.

In this manner, when a temperature responsive medium, such as a thermally responsive wax charge that is disposed within the cylinder 32 of the piston and cylinder arrangement 31, expands upon reaching a certain temperature, the same acts against the piston 30 to move the same and, thus, the valve member 28 to the left from the position illustrated in FIG. 3 to the position illustrated in FIG. 4 to fluidly interconnect a port means 33 of the housing part 22 around a first valve seat means 34 of the housing part 22 to a port means 35 of the second housing part 23.

Conversely, when the temperature being sensed by the temperature responsive device 31 falls below a certain temperature, the wax charge within the cylinder 32 contracts and thereby permits the compression spring 29 to move the valve member 28 back from the position illustrated in FIG. 4 to the position illustrated in FIG. 3 whereby the valve member 28 closes the valve seat 34 while interconnecting the port means 35 of the housing part 23 to a port means 36 of the housing part 24 around a second valve seat 37 of the housing part 23 in a manner hereinafter described.

The housing part 22 includes a retainer 38 turned over an outwardly directed flange 39 of the housing part 22 with the retainer 38 itself having an inwardly turned flange 40 being turned into an annular groove 41 of the cylinder 32 of the piston and cylinder arrangement 31 to hold the piston and cylinder arrangement to the retainer 38 and, thus, to the housing part 22.

The axially movable valve member 28 has a bore 43 interrupting the right end 44 thereof and telescopically receives the piston 30 of the temperature responsive device 31 therein as illustrated in FIG. 3.

The housing part 22 has an inwardly directed annular shoulder 45 defining a spring seat 46 on one side thereof and against which one end 47 of the compression spring 29 abuts while the other side 48 of the shoulder 45 defines the first valve seat 34 which comprises an annular resilient member 49, such as a rubber O-ring or the like, being compressed between the side 48 of the shoulder 45 of the housing part 22 and a side 50 of an inwardly directed annular shoulder 51 on the housing part 23 as illustrated whereby the resilient member 49 projects inwardly beyond the annular shoulders 45 and 51 of the housing parts 22 and 23 to sealingly engage against the valve member 28 as illustrated. Additionally, the resilient member 49 seals the housing parts 22 and 23 together as illustrated.

The other end 52 of the compression spring 29 bears against an outwardly directed annular flange 53 at the end 44 of the valve member 28 to tend to force the valve member 28 to the right in FIG. 3 and against an end 54 of the cylinder 32 as illustrated whereby movement of the valve member 28 to the right is limited by the end 54 of the cylinder 32 of the temperature responsive device 31 even though the piston 30 of the device 31 is adapted to move further to the right through the contracting of the wax charge in the device 31 so that its free end 55 may be disposed slightly spaced from the closed end 56 of the bore 43 of the valve member 28 as illustrated in FIG. 3.

When the valve member 28 of the valve construction 20 is disposed in the position illustrated in FIG. 3, it can be seen that a plurality of grooves 57 formed in the outer periphery of the valve member 28, in a space parallel manner about the end 58 thereof, bridge the valve seat 37 so as to continuously interconnect the ports 35 and 36 together.

Another set of a plurality of spaced parallel grooves 59 are formed in the valve member 28 and are so positioned thereon that when the valve member 28 is disposed in the position illustrated in FIG. 3, the grooves 59 cannot bridge the valve seat 34 until the valve member 28 is moved to the left as illustrated in FIG. 4 whereby the ports 33 and 35 are interconnected together by the grooves 59 and since the grooves 57 have now been moved away from a bridging of the valve seat 37, the ports 35 and 36 are sealed from each other by the valve member 28 as hereinafter described.

The second valve seat means 37 also comprises an annular resilient member 60 disposed in compressed relation between the side 61 of the annular shoulder 51 of the housing part 23 and a side 62 of an inwardly directed annular shoulder 63 of the housing part or end cap 24 as illustrated whereby the resilient member 60 not only inwardly projects beyond the annular shoulders 51 and 63 of the housing parts 23 and 24 as illustrated to sealingly engage against the valve member 28, but also the member 60 provides a seal between the housing parts 23 and 24 as illustrated.

The annular shoulder 51 of the housing part 23 is so constructed and arranged that its right hand end 64 is telescoped within the housing part 22 as illustrated while the right hand end 65 of the shoulder 63 of the housing part 24 is likewise telescoped within the housing part 23 as illustrated whereby the abutting adjacent surfaces 66 and 67 of the housing parts 22 and 23 and the abutting adjacent surfaces 68 and 69 of the housing parts 23 and 24 can be secured together in the assembled relation illustrated in any suitable manner, such as by a suitable adhesive or the like. Alternately, or in addition, the housing parts 22, 23 and 24 could be formed of plastic material which would readily permit the surfaces 66, 67, 68 and 69 to be ultrasonically welded together either serially or after all the housing parts 22, 23 and 24 have been assembled together as the case may be. Of course, the housing parts 22, 23 and 24 could be provided with suitable tongue and groove arrangements to merely permit the same to be snap-fit together if such snap-fit arrangement would provide sufficient strength for handling the desired pressures of the fluid flow through the valving ports thereof.

In any event, it can readily be seen that the housing parts 22, 23 and 24 can be assembled together in a simple and effective manner with the ports 33, 35 and 36 thereof either being disposed in the aligned relation illustrated in FIG. 1 or being disposed in other rotational positions relative to each other depending upon the desired conduit coupling arrangement thereto as the case may be.

Also, if the housing parts 22, 23 and 24 are formed of plastic material, the same can be readily molded in any selected colors so that the same can be readily coded for convenience in hooking the ports thereof into the desired system.

Thus, it can be seen that the valve construction 20 of this invention can be formed in a simple and effective manner to operate in a manner to now be described.

When the temperature being sensed by the temperature responsive device 31 is below a certain temperature whereby the wax charge within the cylinder 32 is in a compacted or contracted condition, the force of the compression spring 29 maintains the valve member 28 to the right against the shoulder 54 of the cylinder 32 whereby the grooves 57 in the valve member 28 fluidly interconnect the ports 35 and 36 together and the closed valve seat 34 prevents fluid interconnection between the ports 33 and 35 because the grooves 59 in the valve member 28 are not bridging the valve seat 34 at this time.

However, when the temperature being sensed by the device 31 increases to a predetermined temperature, the wax charge within the cylinder 32 of the device 31 causes the piston 30 to extend to the left in the manner illustrated in FIG. 4 and abut against the end 56 of the bore 43 of the valve member 28 to move the valve member 28 axially to the left in opposition to the force of the compression spring 29 to the position illustrated in FIG. 4 whereby the valve seat means 37 is now closed by the ungrooved portion of the valve member 28 so that the ports 35 and 36 are no longer interconnected together. However, the grooves 59 in the valve member 28 are now in position to bridge the valve seat 34 so that the ports 33 and 35 are fluidly interconnected together.

Subsequently, should the temperature being sensed by the temperature responsive device 31 fall below a predetermined temperature, the wax charge within the cylinder 32 contracts and the force of the compression spring 29 again moves the valve member 28 axially to the right from the position illustrated in FIG. 4 back to the position illustrated in FIG. 3 whereby the valve member 28 again interconnects the ports 35 and 36 through the grooves 57 and disconnects the ports 33 and 35 as the grooves 59 have been moved from bridging relation with the valve seat means 34.

Therefore, it can be seen that this invention not only provides an improved thermally responsive valve construction, but also this invention provides an improved method of making such a valve construction wherein the housing parts thereof are adapted to be uniquely assembled together and utilize simple resilient annular members for forming valve seats therebetween as well as for sealing the housing parts together.

However, while the valve construction 20 previously described provides two valve seats 34 and 37 with three port means 33, 35 and 36, it is to be understood that a valve construction of the invention can be formed from just the end valve housing parts 22 and 24 if desired.

Figure 6:
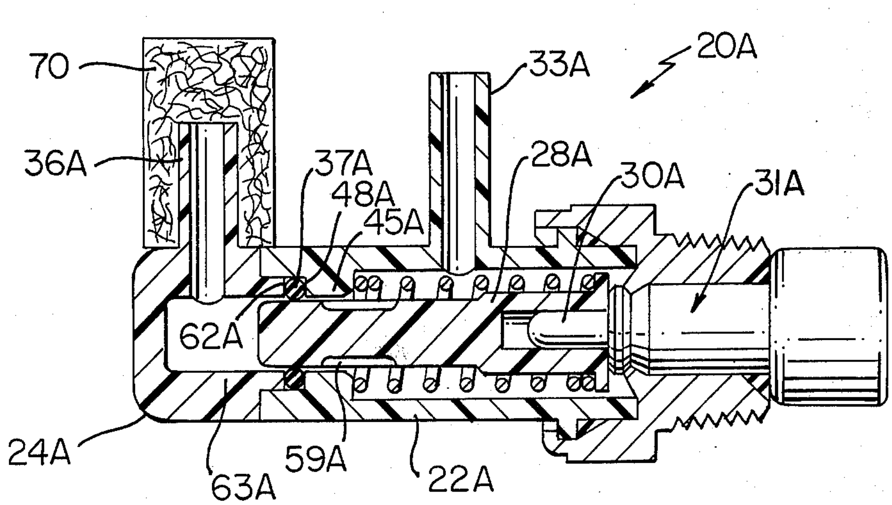
FIG. 6 is a view similar to FIG. 3 and illustrates another valve construction of this invention.
Figure 7:
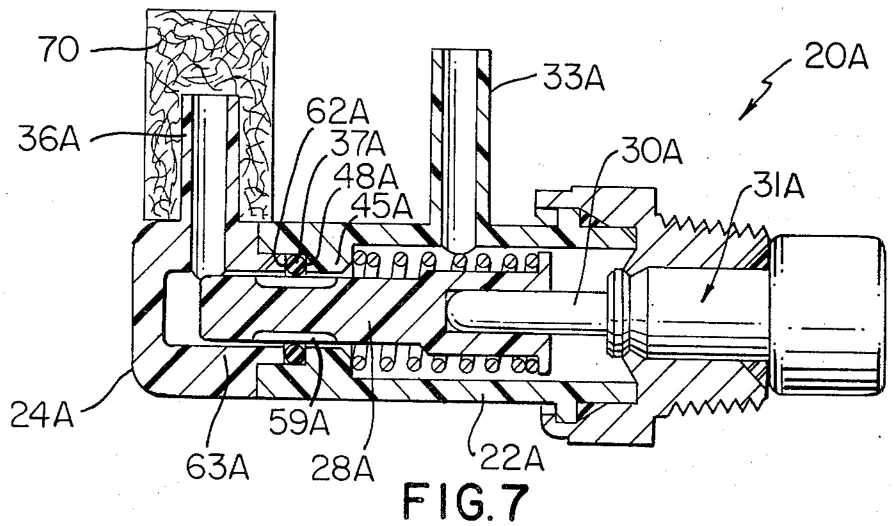
FIG. 7 is a view similar to FIG. 6 and illustrates the valve construction of FIG. 6 in another operating condition thereof.

Therefore, reference is now made to FIGS. 6 and 7 wherein another valve construction of this invention is generally indicated by the reference numeral 20A and parts thereof similar to the valve construction 20 previously described are indicated by like reference numerals following by the reference numeral "A".

As illustrated in FIGS. 6 and 7, the housing part or end cap 24A is directly interconnected to the housing part 22A whereby the resilient annular member 37A disposed between the side 48A of the shoulder 45A of the housing part 22A and the side 62A of the shoulder 63A of the housing part 24A cooperates with the valve member 28A to prevent fluid communication between the port means 33A and 36A when the valve member 28A is to the right as in FIG. 6 by the temperature responsive device 31A sensing a certain temperature. However, when the device 31A senses an increasing temperature to cause the wax charge therein to expand and drive the piston 30A to the left in the manner illustrated in FIG. 7, the piston 30A moves the valve member 28A to the left so that the grooves 59A in the valve member 28A bridges the valve seat member 37A to fluidly interconnect the ports 33A and 36A together.

Therefore, it can be seen that the valve construction 20A functions in substantially the same manner as the valve construction 20 previously described except that the valve construction 20A only has a single valve seat and two ports which are interconnected together when the temperature responsive device is sensing a certain temperature or are completely sealed from each other when the temperature responsive device is sensing another temperature.

If desired, a suitable filter 70 can be utilized to cover the port 36A (or the port 33A or both ports 33A and 36A) to filter fluid flow through the port means 36A either in a fluid exit direction or a fluid entering direction as desired.

While the valve construction 20 previously described has only one center housing part 23 disposed between the respective end housing parts 24 and 22, it is to be understood that a plurality of center housing parts 23 could be disposed in aligned relation between the end housing parts 22 and 24 as desired to provide different valve constructions.

Figure 8:
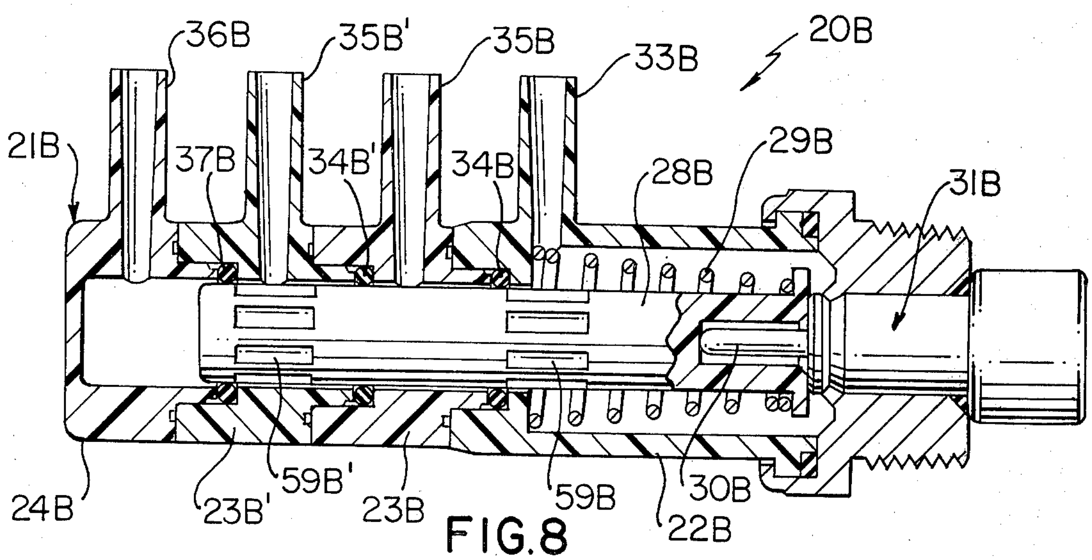
FIG. 8 is a view similar to FIG. 3 and illustrates another valve construction of this invention.
Figure 9:
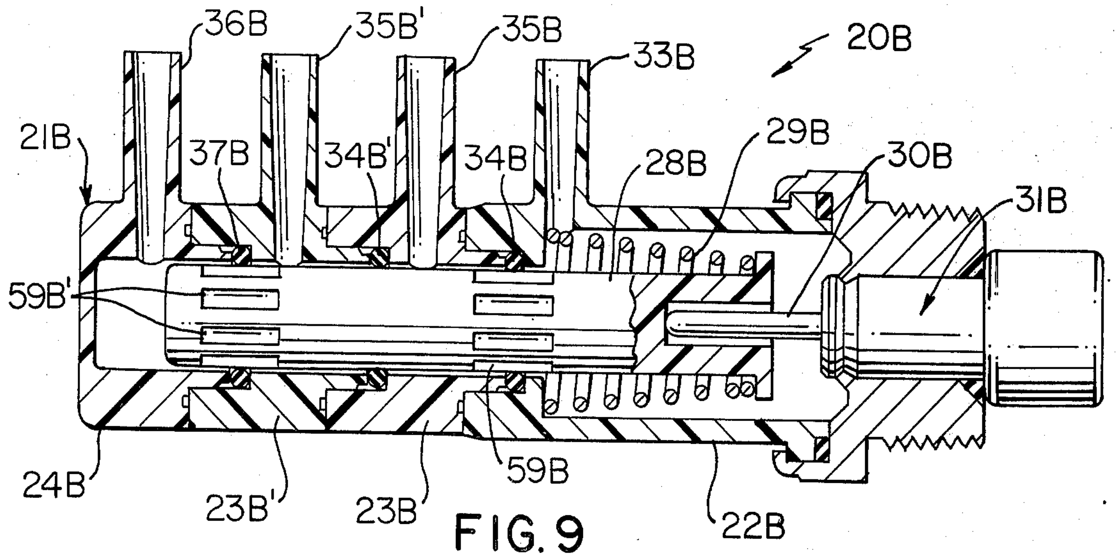
FIG. 9 is a view similar to FIG. 8 and illustrates the valve construction of FIG. 8 in another operating condition thereof.

For example, reference is now made to FIGS. 8 and 9 wherein another valve construction of this invention is generally indicated by the reference numeral 20B and parts thereof similar to the valve construction 20 previously described are indicated by like reference numerals followed by the reference numeral "B".

As illustrated in FIGS. 8 and 9, the valve construction 20B has the end housing parts 22B and 24B with two like center housing parts 23B and 23B' disposed therebetween whereby three valve seats 34B, 34B' and 37B are provided in the housing means 21B to be controlled by the valve member 28B which has two sets of grooves 59B and 59B' therein to operate in a manner now to be described.

When the temperature responsive device 31B is sensing a certain temperature so that the force of the compression spring 29B has the valve member 28B fully to the right in the manner illustrated in FIG. 8, both sets of grooves 59B and 59B' are not respectively bridging the valve seats 34B and 37B whereby the port 33B is sealed by the valve seat 34B from the port 35B, the valve seat 34B' is sealing the port 35B from the port 35B' and the valve seat 37B is sealing the port 35B' from the port 36B.

However, once the temperature being sensed by the device 31B increases to the point that the piston 30B moves the valve member 28B to the right in the manner illustrated in FIG. 9, both sets of grooves 59B and 59B' are respectively bridging the valve seat means 34B and 37B so that the port 33B is interconnected to the port 35B and the port 35B' is interconnected to the port 36B to provide a desired valving function. Subsequently, when the temperature being sensed by the device 31B decreases, the valve member 28B is again moved back to the right by the force of the compression spring 29B to again disconnect the port 33B from the port 35B and the port 35B' from the port 36B as illustrated in FIG. 8.

If desired, the thermally responsive device of this invention can be so constructed and arranged that the same will cause a different valving function at different increases in sensed temperature thereof.

Figure 10:
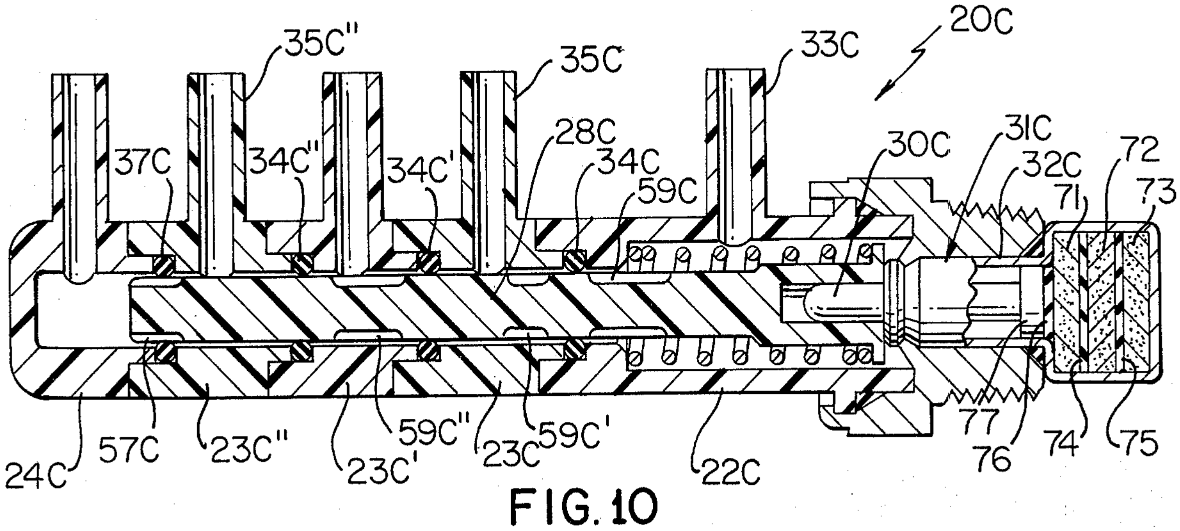
FIG. 10 is a view similar to FIG. 3 and illustrates another valve construction of this invention.
Figure 11:
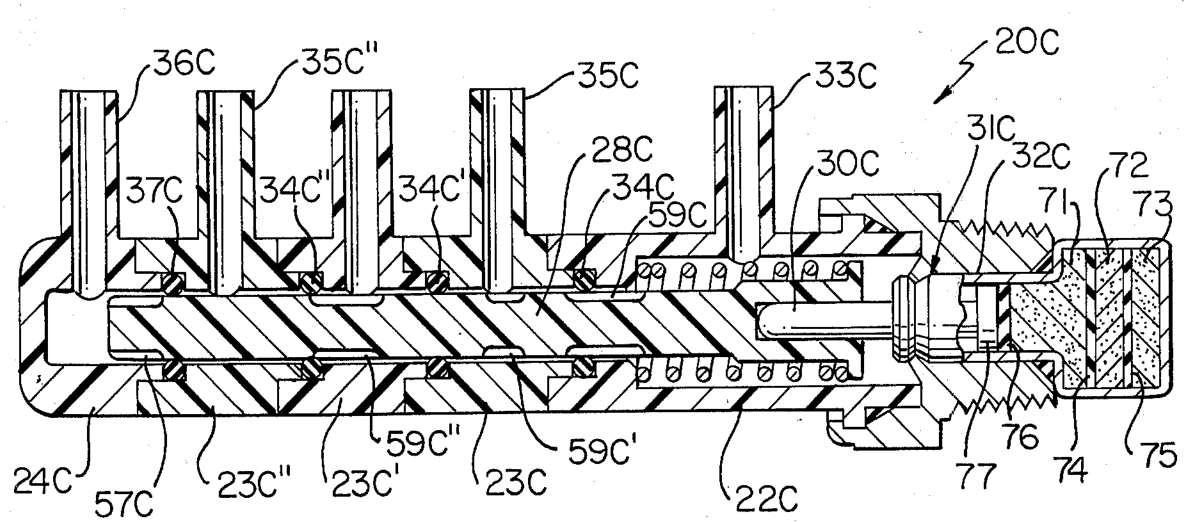
FIG. 11 is a view similar to FIG. 10 and illustrates the valve construction of FIG. 10 in another operating condition thereof.

For example, another valve construction of this invention is generally indicated by the reference numeral 20C in FIGS. 10 and 11 and parts thereof similar to the valve construction 20 previously described are indicated by like reference numerals followed by the reference letter "C".

As illustrated in FIGS. 10 and 11, the valve construction 20C includes the two end housing means or parts 22C and 24C as previously described but includes three like middle housing parts 23C, 23C' and 23C'' disposed in stacked aligned relation to define four valve seat means 34C, 34C', 34C'' and 37C to be controlled by the axially movable valve member 28C which has a plurality of sets of grooves 59C, 59C', 59C'' and 57C formed therein to operate in a manner hereinafter described.

As illustrated in FIGS. 10 and 11, the cylinder 32C of the temperature responsive device 31C is broken away to illustrated three different segments of wax charges 71, 72 and 73 respectively separated by flexible diaphragm means 74 and 75 with the wax charge 71 bearing against a diaphragm means 76 that engages the end 77 of the piston 30C as illustrated.

Each wax charge 71, 72 and 73 expands upon reaching a different temperature so that when the wax charge 71 senses a certain temperature, the same expands in the manner illustrated in FIG. 11 to move the valve member 28C a certain increment to the left whereby the first set of grooves 59C of the valve member 28C now interconnects the port means 33C to the port means 35C while the grooves 57C are moved out of bridging relation of the valve seat 37C to disconnect the port means 35C'' from the port 36C as illustrated in FIG. 11, the grooves 59C' and 59C'' not bridging the valve seats 34C and 34C' at this time. However, when the temperature increases to another higher temperature, the wax charge 72 will expand to further drive the valve member 28C to the right so that the grooves 59C'' can interconnect the port means 35C' to the port means 35C'' and a subsequent expansion of the wax charge 73 at another higher temperature will cause the groove means 59C' to bridge the valve seat means 34C' to interconnect the port means 35C and 35C' together. Of course, multi-range thermally responsive devices per se are well known in the art. For example, see the U.S. Pat. No. 3,438,256.

Therefore, by merely providing the desired number of housing parts 22, 23 and 24 as well as a proper grooving in the valve member 28C and a proper selection of the temperature responsive device 31, whether the same is to be a stepped operation or a single expansion thereof, many different types of valve constructions can be provided by the relatively few basic parts of this invention with each valve construction being easily assembled together as the annular resilient members disposed between each housing part not only seals the respective housing parts together, but also provides a valve seat means therebetween. The housing parts can be rotated to any orientation relative to the other housing parts as provided and being properly coded through a molding process so that the housing parts can be readily secured together in the desired assembled relation by a snapfit relation, adhesive relation, or ultrasonic welding operation as desired.

Therefore, it can be seen that this invention not only provides an improved valve construction, but also this invention provides an improved method of making such a valve construction.

While the forms and methods of this invention now preferred have now been illustrated and described as required by the Patent Statutes, it is to be understood that other forms and method steps can be utilized and still fall within the scope of the appended claims.

What is claimed is:

1. A condition responsive valve construction comprising a first housing means having an internal chamber therein and an inwardly directed shoulder projecting into said chamber and defining a first valve seat on one side thereof and a spring seat on the other side thereof, said chamber defining an open end of said first housing means that is spaced outboard of said shoulder, an axially movable valve member disposed in said chamber for controlling said first valve seat, a spring disposed between said spring seat and said valve member to tend to move said valve member in one axial direction in said chamber, and a condition responsive device carried by said first housing means and being operatively interconnected to said valve member to move said valve member in the other axial direction upon an increase in sensed condition, and a second housing means being secured to said first housing means and having a chamber aligned with said chamber of said first housing means and receiving said valve member therein, said second housing means having an inwardly directed shoulder projecting into its respective chamber, said first valve seat comprising a resilient annular member disposed against said one side of said shoulder of said first housing means and against an adjacent side of said shoulder of said second housing means while projecting inwardly beyond said shoulders to sealingly engage said valve member, said adjacent side of said shoulder of said second housing means being disposed in said chamber of said first housing means and, thus, being disposed inboard of said open end of said first housing means.

2. A condition responsive valve construction as set forth in claim 1 wherein said first housing means has first port means leading from the exterior thereof to said chamber thereof on one side of said first valve seat, said second housing means having second port means leading from the exterior thereof to said chamber thereof on the other side of said first valve seat.

3. A condition responsive valve construction as set forth in claim 2 wherein said second housing means comprises an end cap that has an end wall that closes off the aligned chambers at one end of said valve construction.

4. A condition responsive valve construction as set forth in claim 2 wherein a third housing means is secured to said second housing means and has a chamber aligned with said chamber of said second housing means and receiving said valve member therein.

5. A condition responsive valve construction as set forth in claim 4 wherein said third housing means has an inwardly directed shoulder projecting into its respective chamber, and a second valve seat comprising another resilient annular member disposed between and against adjacent sides of said shoulders of said second and third housing means while projecting inwardly beyond said shoulders to sealing engage said valve member, said third housing means having third port means leading from the exterior thereof to said chamber thereof, said second valve seat being disposed intermediate said second and third port means.

6. A condition responsive valve construction as set forth in claim 5 wherein said third housing means comprises an end cap that has an end wall that closes off the aligned chambers at one end of said valve construction.

7. A condition responsive valve construction as set forth in claim 5 wherein said second and third housing means are substantially identical.

8. A condition responsive valve construction as set forth in claim 1 wherein said condition responsive device is temperature responsive.

9. A condition responsive valve construction as set forth in claim 8 wherein said device comprises a piston and cylinder temperature responsive device.

* * * * *